G. E. HOTTENSTEIN.
TIRE CASING.
APPLICATION FILED FEB. 27, 1918.
1,298,213. Patented Mar. 25, 1919.
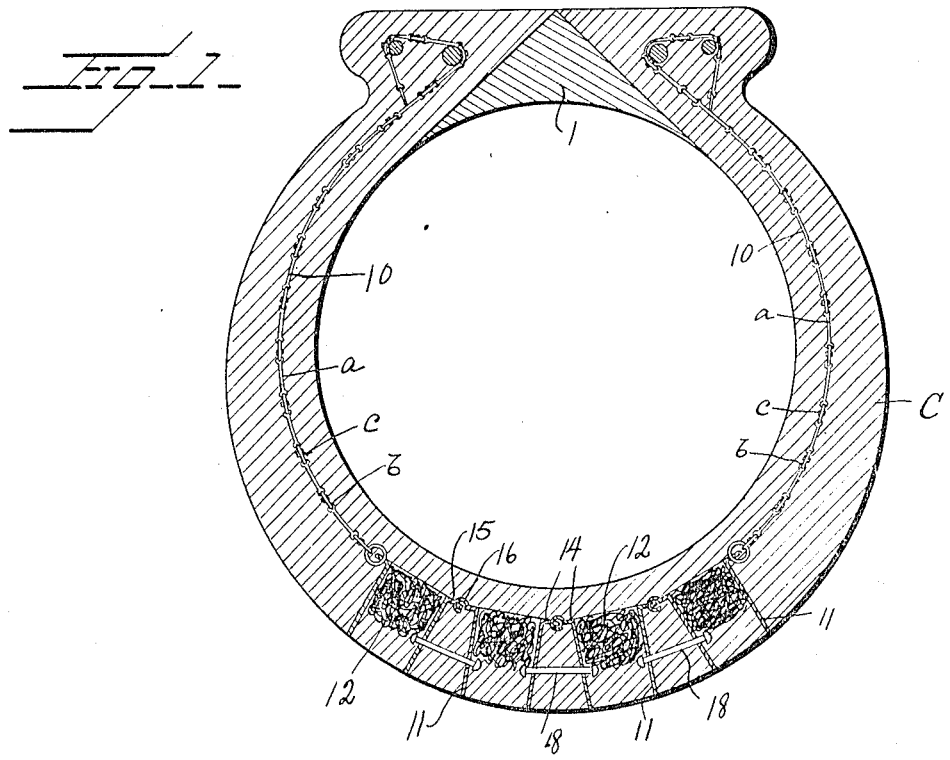
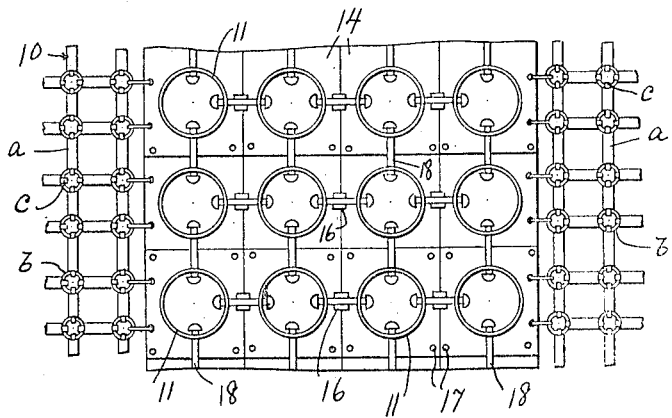
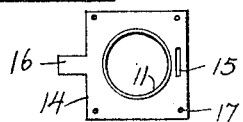
Inventor
G. E. Hottenstein
By Watson E. Coleman
Attorney

UNITED STATES PATENT OFFICE.

GEORGE E. HOTTENSTEIN, OF MIAMI, ARIZONA.

TIRE-CASING.

1,298,213.  Specification of Letters Patent.  Patented Mar. 25, 1919.

Application filed February 27, 1918. Serial No. 219,453.

*To all whom it may concern:*

Be it known that I, GEORGE E. HOTTENSTEIN, a citizen of the United States, residing at Miami, in the county of Gila and State of Arizona, have invented certain new and useful Improvements in Tire-Casings, of which the following is a specification, reference being had to the accompanying drawings.

This invention relates to certain improvements in tire casings and has relation more particularly to a device of this general character employed in connection with a tire of a pneumatic type and it is an object of the invention to provide a casing with novel and improved means whereby effective resistance is offered to the pressure imposed upon the casing when the tire is inflated and at the same time permitting the casing to have the requisite resiliency.

It is also an object of the invention to provide a novel and improved casing embodying an internal armor to effectively protect the casing against puncture or blowout.

An additional object of the invention is to provide a novel and improved casing including an internal armor and wherein said armor is effectively maintained in substantially a fixed position within the body of the casing.

A still further object of the invention is to provide a novel and improved tire casing having an internal armor embedded in the body thereof and which armor is of such type to permit the casing to be produced from a materially less amount of material, preferably rubber, which is employed in the construction of general or ordinary types of casings.

The invention consists in the details of construction and in the combination and arrangement of the several parts of my improved tire casing whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a cross sectional view taken through a casing constructed in accordance with an embodiment of my invention;

Fig. 2 is a fragmentary view in plan of the internal armor as disclosed in Fig. 1;

Fig. 3 is a view in top plan of one of the members embodied in the tread armor as herein disclosed.

As disclosed in the accompanying drawings C denotes a casing of a type adapted to be employed in connection with an inner tube, although if preferred said casing may be constructed in a manner to obviate the use of an inner tube. The casing C is formed in a conventional manner by superimposed laminations of rubber and canvas or the like, but as this in itself forms no essential feature of my invention a detailed description and illustration thereof is believed to be unnecessary.

1 denotes an internal annular shield coacting with the marginal portions of the casing, when the same is applied to the rim of a wheel, and serves to protect an inner tube arranged within the casing from pinch or other injury. It is also to be noted that the tread portion of the casing is of a greater thickness than the side walls of the casing. This structure is permitted in view of the internal armor embedded within the tire which will hereinafter be more particularly referred to. By having these differences in the thickness of the walls of the casing and the tread, it is to be stated that a decided advantage is afforded as a material saving of material is permitted.

A plurality of tubular members 11 are embodied within the tread portion of the tire with the outer ends flushed with the periphery of the casing C. In building the tire, it is preferred that the inner portions of the tubular members 11 be partially filled with compressed paper 12 or other fabric and the outer portions of said members filled with rubber.

At either ends, the members 11 are provided with the oppositely directed flanges 14. One of the flanges of each of the members 14 is provided with a recess or opening 15 to receive a tongue 16 carried by the adjacent flange 14 of a succeeding member 11. The corner portions of adjacent flanges are adapted to overlap and to be connected one to the other, as indicated at 17 by rivets or other fastening means.

Connecting the adjacent members 11 are the rivets 18 positioned intermediate the length of said members and the rivets 18 have sliding engagement with the members 11 so that said members 11 may have sliding relative movement as occasioned by the necessities of practice.

The flanges 14 of the outer or side members 11 have secured thereto the chain fabrics 10, said fabrics being of predetermined mesh and the links comprised in the fabric are preferably of metal. The fabrics 10 extend entirely across the side walls of the tire, and as disclosed in Fig. 1 to a point in close proximity to the margins or beads thereof. The fabrics 10 serve to materially relieve the side portions of the casing against the strain of the fluid pressure when the tire is inflated, this serves to substantially eliminate the possibility of a blowout and which advantageous result is further facilitated by having the fabrics 10 secured to the tread armor.

As herein disclosed each of the fabrics comprises the flat links $a$ having their end portions engaged with the links $b$ through the medium of the return tongues $c$ carried by the said links $a$. As is indicated in Fig. 1, it is to be noted that the tongues $c$ are extended in a direction toward the periphery of the casing C so that the links form a smooth surface against the pressure of the inner wall of the casing C.

It is also desired that the members 11 and their concomitant parts have applied either a coating of asbestos or other non-heat conducting material to prevent the metal parts from becoming heated by friction incident to the travel of the casing over the ground. Otherwise the members 11 and their concomitant parts will have a tendency to retain the heat which would have an injurious effect upon the rubber.

From the foregoing description, it is thought to be obvious that a tire casing constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a tire casing, a plurality of tubular members embedded within the tread portion of the casing with the outer ends thereof substantially flush with the periphery of the casing, the inner ends of said tubular members being provided with oppositely directed flanges, the flanges of adjacent members interlocking, and rivets connecting adjacent tubular members and positioned intermediate the length thereof.

2. In combination with a tire casing, a plurality of tubular members embedded within the tread portion of the casing with the outer ends thereof substantially flush with the periphery of the casing, the inner ends of said tubular members being provided with oppositely directed flanges, the flanges of adjacent members interlocking, and rivets connecting adjacent tubular members and positioned intermediate the length thereof, said rivets having sliding engagement with the members.

3. The combination with a tire casing, a plurality of tubular members embedded within the tread portion of the casing with the outer ends thereof substantially flush with the periphery of the casing, and elements connecting adjacent tubular members and positioned intermediate the length thereof, said elements having sliding movement through the walls of the tubular member.

In testimony whereof I hereunto affix my signature in the presence of two witnesses.

GEORGE E. HOTTENSTEIN.

Witnesses:
J. D. BUSH,
CHARLES HAMMETT.